(12) United States Patent
Lavoie et al.

(10) Patent No.: US 8,873,925 B2
(45) Date of Patent: Oct. 28, 2014

(54) FIBER OPTIC HINGE

(75) Inventors: Hervé Lavoie, Mont-Royal (CA); Alain Villeneuve, Mont-Royal (CA); Bryan Burgoyne, Montréal (CA); Nathalie Richard, Montréal (CA)

(73) Assignee: Genia Photonics Inc., Laval, QC ( * ) Notice: Subject to any disclaimer, the term of this patent is extended or adjusted under 35 U.S.C. 154(b) by 0 days.

(21) Appl. No.: 13/701,629

(22) PCT Filed: Jun. 3, 2011

(86) PCT No.: PCT/CA2011/050340
§ 371 (c)(1),
(2), (4) Date: Dec. 3, 2012

(87) PCT Pub. No.: WO2011/150522
PCT Pub. Date: Dec. 8, 2011

(65) Prior Publication Data
US 2013/0077929 A1    Mar. 28, 2013

Related U.S. Application Data

(60) Provisional application No. 61/351,094, filed on Jun. 3, 2010.

(51) Int. Cl.
*G02B 6/00* (2006.01)
*G02B 6/44* (2006.01)
(52) U.S. Cl.
CPC ............ *G02B 6/00* (2013.01); *G02B 6/4455* (2013.01)
USPC .......... 385/135; 385/134; 385/136; 385/137; 385/138; 385/139

(58) Field of Classification Search
USPC ................................ 385/134–139
See application file for complete search history.

(56) References Cited

U.S. PATENT DOCUMENTS

| 4,792,203 | A | 12/1988 | Nelson et al. |
| 5,323,478 | A | 6/1994 | Milanowski et al. |
| 5,740,299 | A | 4/1998 | Llewellyn et al. |
| 5,778,131 | A | 7/1998 | Llewellyn et al. |
| 5,987,207 | A * | 11/1999 | Hoke ............................ 385/135 |
| 6,736,521 | B1 | 5/2004 | Turner |
| 7,210,860 | B2 * | 5/2007 | Marcinkiewicz et al. ...... 385/88 |
| 7,613,377 | B2 * | 11/2009 | Gonzales et al. ............. 385/135 |
| 2006/0133738 | A1 * | 6/2006 | Marcinkiewicz et al. ...... 385/88 |
| 2007/0032275 | A1 * | 2/2007 | Suzuki et al. .............. 455/575.3 |
| 2007/0086721 | A1 * | 4/2007 | Dobbins et al. ............... 385/135 |
| 2007/0297727 | A1 | 12/2007 | Ueno et al. |
| 2009/0022467 | A1 | 1/2009 | Puetz et al. |
| 2009/0103865 | A1 * | 4/2009 | Del Rosso ....................... 385/32 |

(Continued)

FOREIGN PATENT DOCUMENTS

| EP | 2 159 617 | 3/2010 |
| GB | 2312053 | 10/1997 |

(Continued)

*Primary Examiner* — Ryan Lepisto
*Assistant Examiner* — Guy Anderson
(74) *Attorney, Agent, or Firm* — Norton Rose Fulbright Canada LLP; Alexandre Dagust (57) ABSTRACT

The fiber optic hinge can mechanically connect a first fiber optic tray and a second fiber optic tray of a fiber optic device, while providing an optical fiber path extending continuously through the first and second hinge members.

8 Claims, 7 Drawing Sheets

(56) References Cited

U.S. PATENT DOCUMENTS

| | | | |
|---|---|---|---|
| 2009/0252472 A1* | 10/2009 | Solheid et al. | 385/135 |
| 2009/0304342 A1* | 12/2009 | Adomeit et al. | 385/135 |
| 2010/0101277 A1 | 4/2010 | Gonthier et al. | |
| 2010/0260458 A1* | 10/2010 | Sato | 385/96 |

FOREIGN PATENT DOCUMENTS

| | | |
|---|---|---|
| WO | 2004/110122 | 12/2004 |
| WO | 2007/072137 | 6/2007 |
| WO | 2009/106874 | 9/2009 |
| WO | 2011/150522 | 12/2011 |

\* cited by examiner

FIBER OPTIC HINGE

CROSS-REFERENCE TO RELATED APPLICATIONS

This application is a national phase entry of PCT/CA2011/050340, filed 3 Jun. 2011, and claims priority of U.S. provisional application No. 61/351,094, filed Jun. 8, 2010 by applicant.

BACKGROUND

Several types of fiber optic systems can have fiber optic components on more than one fiber optic tray. This is especially the case especially in systems designed for occupying a limited volume. It was known for instance in the field of lasers or amplifiers using fiber optics to mount the fiber optics on several superposed trays in a fixed structure. However, such designs had maintenance limitations including the fact that when a component of the system broke, a relatively large portion of the stack required disassembly to allow replacing the component, which led to undesirably high maintenance-associated costs.

Optical fibers have particular handling characteristics. One of these is the fact that during use, they can be curved to a certain extent, but bending past a critical radius will likely affect the light transmission ability. The critical radius is a specification of optical fibers which are typically made available to designers, so that fiber optic systems can be designed with optical fiber paths which avoid having areas of curvature which are inferior to the critical radius of the given fiber it is intended to receive. Another of these is that optical fibers have a limited tolerance to mechanical stress and are relatively fragile. It was therefore known, for instance, to design an optical fiber path in a fixed stack fiber optic laser which transited from one tray to the next in a progressive fashion.

SUMMARY

In accordance with one aspect, there is provided a fiber optic hinge which is both mechanically interconnected to fiber optic trays foldable with respect to one another, and allows transition of at least one optical fiber between the trays through the hinge. In this manner, the trays can be made openable to access the components with little or no disassembly required, and potentially even while the device is being operated.

In accordance with one aspect, there is provided a fiber optic hinge mechanically connectable to a first fiber optic tray and a second fiber optic tray of a fiber optic device, the fiber optic hinge comprising a first hinge member securable to the first fiber optic tray, a second hinge member securable to the second fiber optic tray, the first hinge member being pivotally connected to the second hinge member about a hinge axis of the first and second fiber optic trays, each of the first and second fiber optic trays having a corresponding optical fiber port oriented toward the corresponding tray, away from the hinge axis, and an optical fiber path extending continuously through the first and second hinge members between the port in the first hinge member and the port in the second hinge member and passing by the hinge axis.

In accordance with another aspect, there is provided a fiber optic device such as a laser or amplifier using fiber optics, in which two or more trays are hingedly interconnected, and where an optical fiber path between at least two of the trays passes through the hinge.

DETAILED DESCRIPTION

Figure 1:
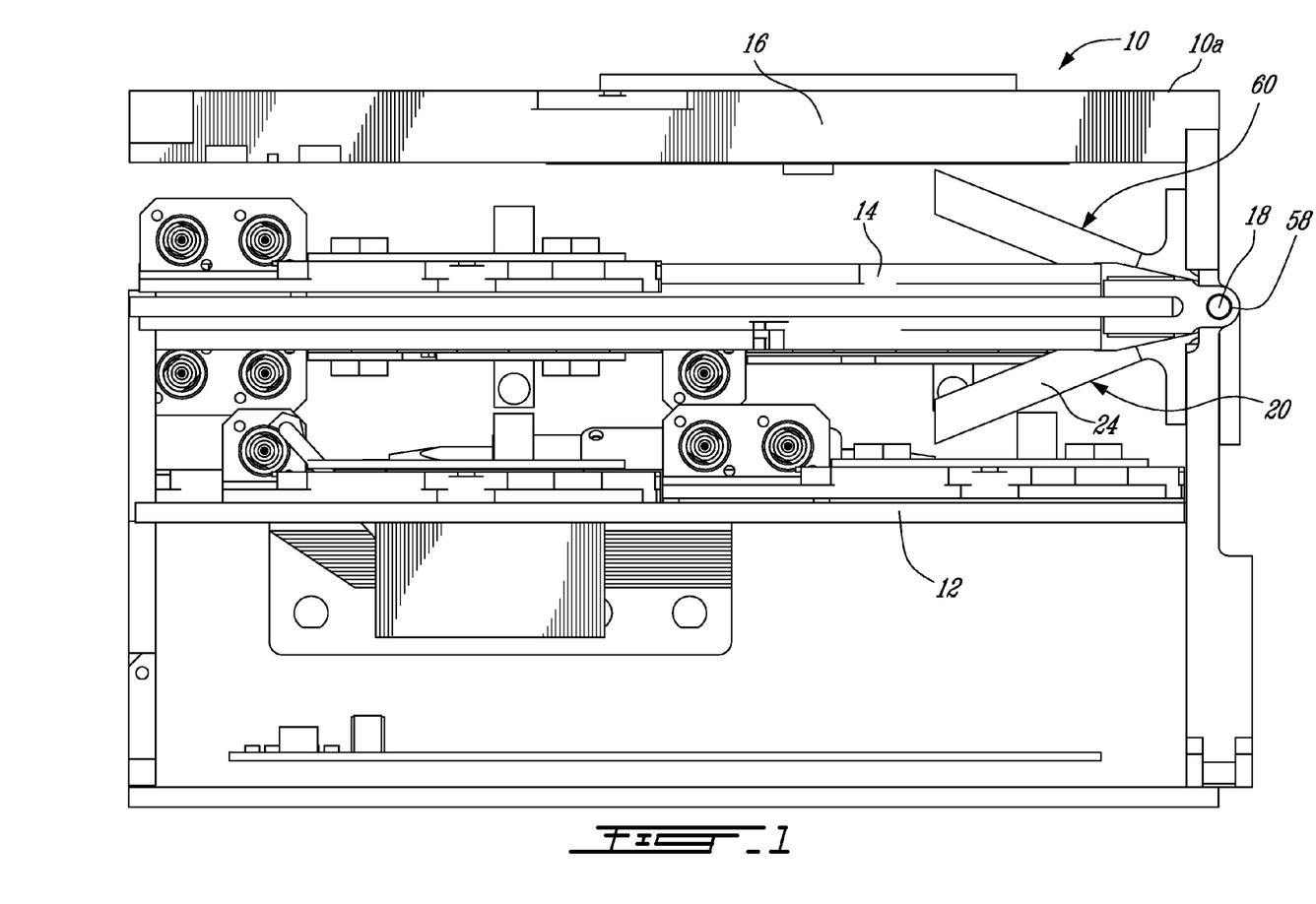
FIG. 1 is an elevation view of an example of a fiber optic device.
Figure 2:
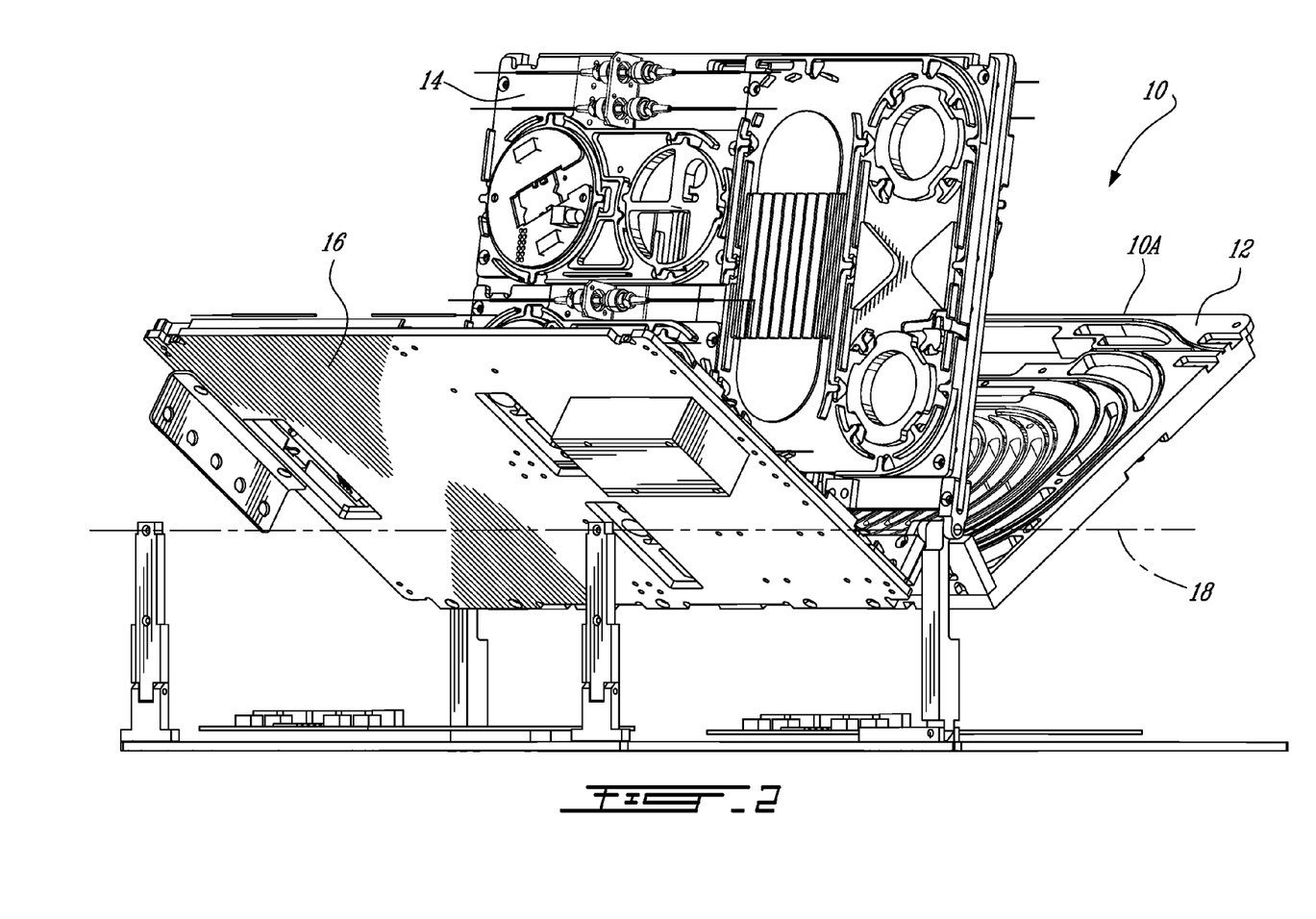
FIG. 2 is an oblique view of the fiber optic device with trays hingedly opened relative to one another.

FIG. 1 shows an example of a fiber optic device 10 having hingedly interconnected fiber optic trays 12, 14, 16. In this particular example, the fiber optic device 10 illustrated is a fiber optic laser 10a which includes three hinged fiber optic trays 12, 14, 16. More or fewer fiber optic trays can be used in alternate embodiments. In this particular example, all three of the hinged fiber optic trays 12, 14, 16 are pivotally hinged about a common hinge axis 18. In alternate embodiments, the fiber optic trays can be hinged about distinct axes, such as in an accordion configuration for instance. In FIG. 2, the fiber optic trays 12, 14, 16 are shown deployed. Providing a device 10 using fiber optics with hinged trays can significantly ease maintenance compared to fixed stacks, by allowing easier access to malfunctioning fiber optic components on the hinged trays for replacement.

Figure 3:
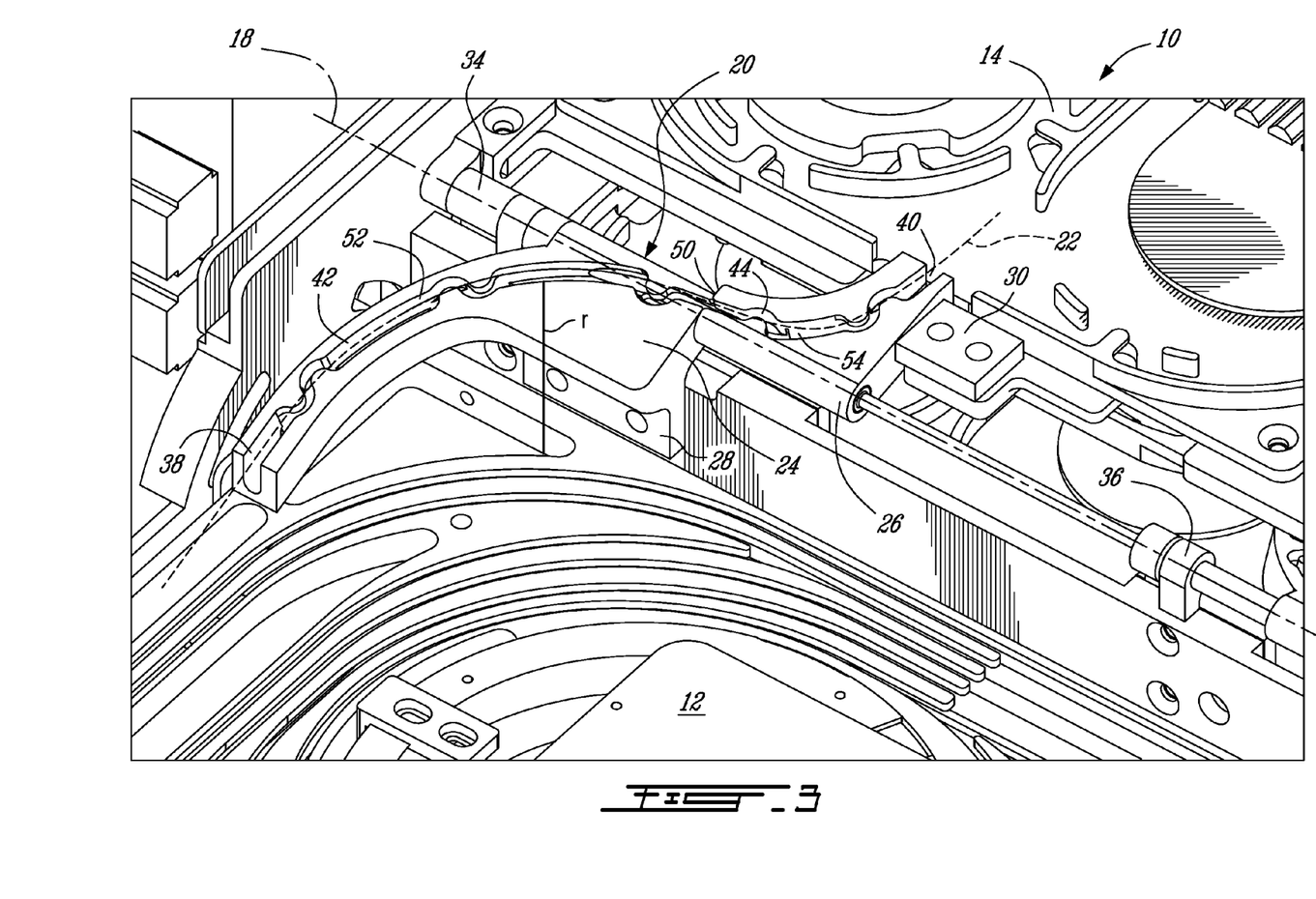
FIG. 3 is an oblique view showing a fiber optic hinge of the fiber optic device.

In this particular example, a fiber optic hinge 20 shown in FIG. 3 is used to provide an optical fiber path 22 between two of the fiber optic trays 12, 14. The fiber optic hinge 20 is designed to protect the functionality of the optical fiber(s) to be received therein, especially during folding and unfolding of the trays 12, 14 about the hinge 20. Further, the hinge 20 can provide the versatility of using the fiber optic device in any one of a folded and unfolded state for instance. Fiber optic devices can include more than one fiber optic hinge.

In FIG. 3, the fiber optic hinge 20 can be seen to include two main components: a first hinge member 24 and a second hinge member 26. The first hinge member 24 is secured to a first fiber optic tray 12 in a manner that it can pivot collectively with it around the hinge axis 18. Similarly, the second hinge member 26 is secured to a second fiber optic tray 14 in a manner that it can pivot collectively with it around the hinge axis 18, relative to the collective first hinge member 24 and the first fiber optic tray 12. In this particular example, the hinge members 24, 26 are secured to corresponding fiber optic trays 12, 14 via a corresponding securing flange 28, 30. Further, the first fiber optic tray 12 is hingedly connected to the second fiber optic tray 14 by means other than the fiber optic hinge 20, though it will be understood that in alternate embodiments, the first fiber optic tray 12 can be connected to the second fiber optic tray 14 solely by means of the fiber optic hinge 20.

In this particular example, a supplemental, structural hinged connection 34, 36 is provided between the fiber optic trays 12, 14 and each one of the hinge portions 24, 26 is connected to a corresponding portion of the structural hinged connection 34, 36 by a shaft extending along the hinge axis 18. Each one of the hinge members 24, has an optical fiber port 38, 40 which extends toward the corresponding fiber optic tray 12, 14, away from the hinge axis 18, into or from which optical fiber enters or exits the corresponding hinge member 24, 26. The hinge members 24, 26 each have a channel 42, 44 extending from the port 38, 40, and the channels 42, 44 communicate at a pivotal connection 50 between the two hinge members 24, 26, defining an optical fiber path 22. Optical fiber (not shown) extending along the optical fiber path 22 in the channels 42, 44 is protected during normal use of the device. In this particular embodiment, the channels 42, 44 have an opening 52, 54 on a side (face) opposite the corresponding tray 12, 14 to allow easier installation of the optical fiber. The openings 52, 54 bridge when the fiber optic trays 12, 14 are in the open state shown in FIG. 3. In this embodiment, it can be understood that the optical fiber path 22 coincides with the hinge axis 18 at the pivotal connection 50.

Figure 4:
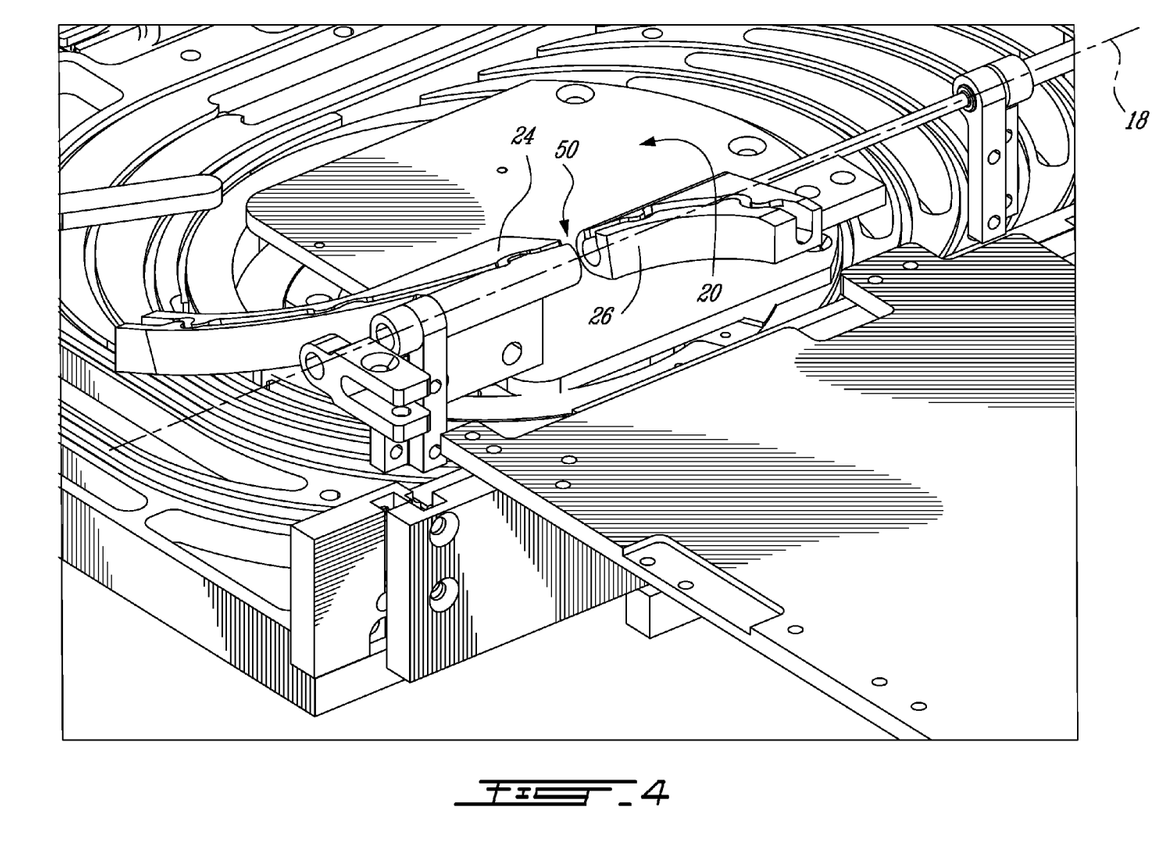
FIG. 4 is an exploded view of the fiber optic hinge.

FIG. 4 shows the fiber optic hinge 20 exploded. It will be noted here that the pivotal connection 50 between the first hinge member 24 and the second hinge member 26 can optionally include a male member which is configured to pivotally mate with a female member provided on the other hinge member and act as an extension of a shaft coinciding with the hinge axis 18.

In FIGS. 1 and 2, it can also be seen that in this particular embodiment, the second fiber optic tray 14 defines a plane which is parallel to and aligned with the hinge axis 18. The first fiber optic tray 12 defines a plane which is parallel but offset from the hinge axis 18, to allow for the thickness of fiber optic components between the trays 12, 14. To bridge this gap, the first hinge member 24 (FIG. 3), extends obliquely between the two trays 12, 14 when the latter are folded parallel to one another, and is made longer than the second hinge member 26.

Further, in this particular embodiment, a third fiber optic tray 16 similar in configuration to the first fiber optic tray 12 is also provided, opposite the second fiber optic tray 14, and similarly connected using a fiber optic hinge 60. There can be even more trays in alternate embodiments. In the particular embodiment of a laser or amplifier using fiber optic components, it can be practical to mount all the trays 12, 14, 16 about a common pivot 58 located centrally relatively to a base, in a manner that the trays 12, 14, 16 can be pivoted like pages of a book and have supports on both sides during assembly.

Figure 5:
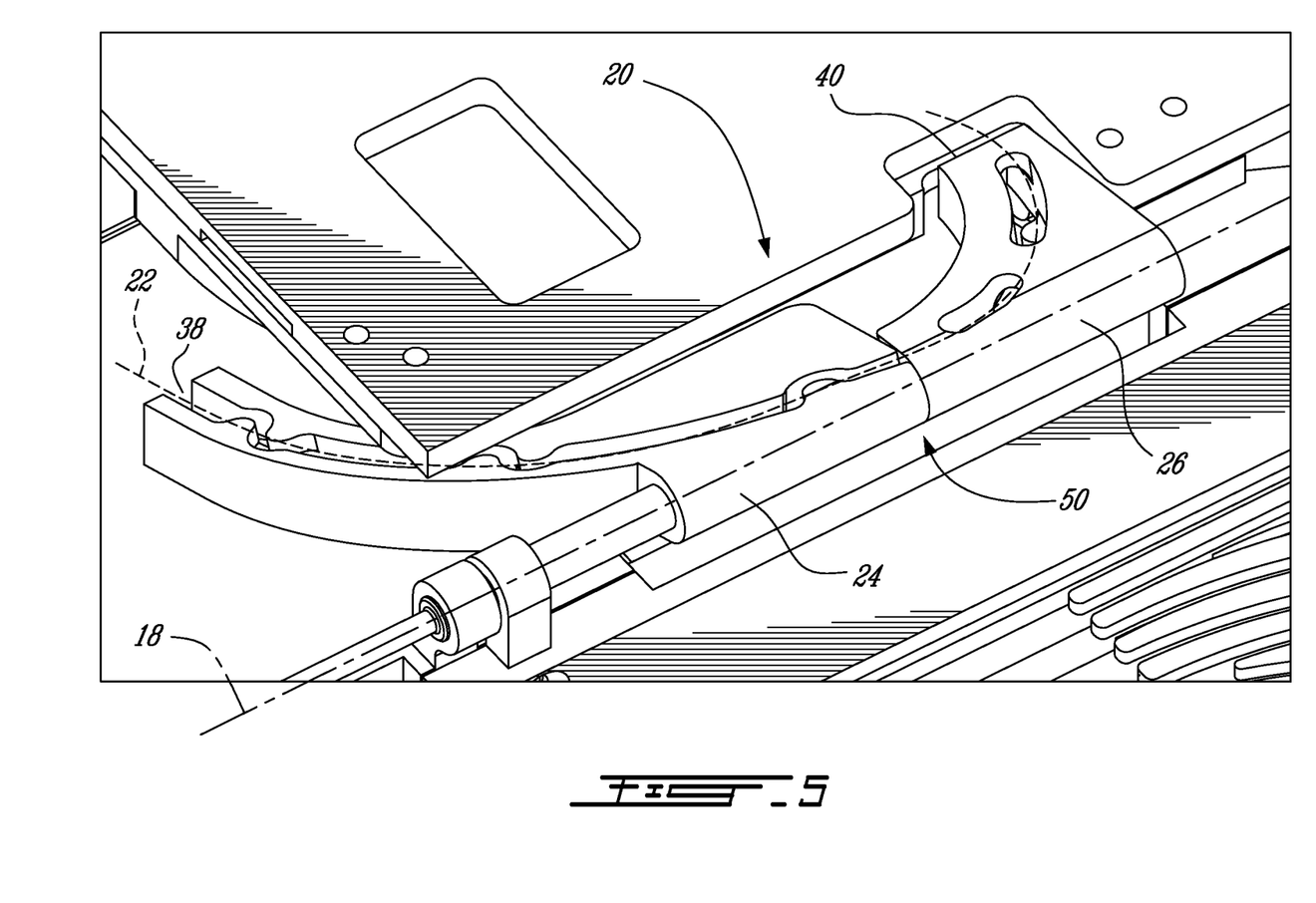
FIG. 5 is another oblique view of the fiber optic hinge, showing it in a folded state.

Referring back to FIG. 3, it can be seen that at any point along its length, the optical fiber path 22 in the fiber optic hinge 20 has a radius of curvature which is greater than the critical radius of curvature for the particular optical fiber. In this embodiment, the radius of curvature r in the fiber optic hinge 20 brings the orientation of the optical fiber from normal to the hinge axis 18, to parallel to the hinge axis 18, to back to normal to the hinge axis 18. The entry and exit orientation, i.e. the orientation of the optical fiber which enters or exit the fiber optic hinge, can differ depending of the orientation of the ports 38, 40 in alternate embodiments. The optical fiber path 22 being defined in a rigid channel 42, 44, the radius of curvature r is maintained independently of the folding of the fiber optic hinge 20, such as shown in FIG. 5, for instance. When the optical fiber is sufficiently freely held in the fiber optic hinge 20, and during normal use, torsion stress is the only significant stress to which the optical fiber is subjected. The configuration can allow the fiber optic trays 12, 14 to be opened and closed without any significant tension stress being applied by the trays 12, 14 or hinge 20 to the optical fibers along the fiber path 22.

Most optical fibers can withstand a substantial amount of torsion stress. Further, in this particular embodiment, as long as the optical fiber in the channel 42, 44 is substantially free from torsion hindrance, the torsion stresses are spread along a substantial length of optical fiber, which helps avoid occurrences of undesirably high concentrations of torsion stresses. Allowing the optical fiber to have a given freedom of movement when inside the channel contributes to avoid such occurrences. The amount of length of the optical fiber path inside the fiber optic hinge 20, and extending freely out both ports 38, 40, also contributes to spread out the torsion stress to satisfactorily low concentrations.

Figure 6:
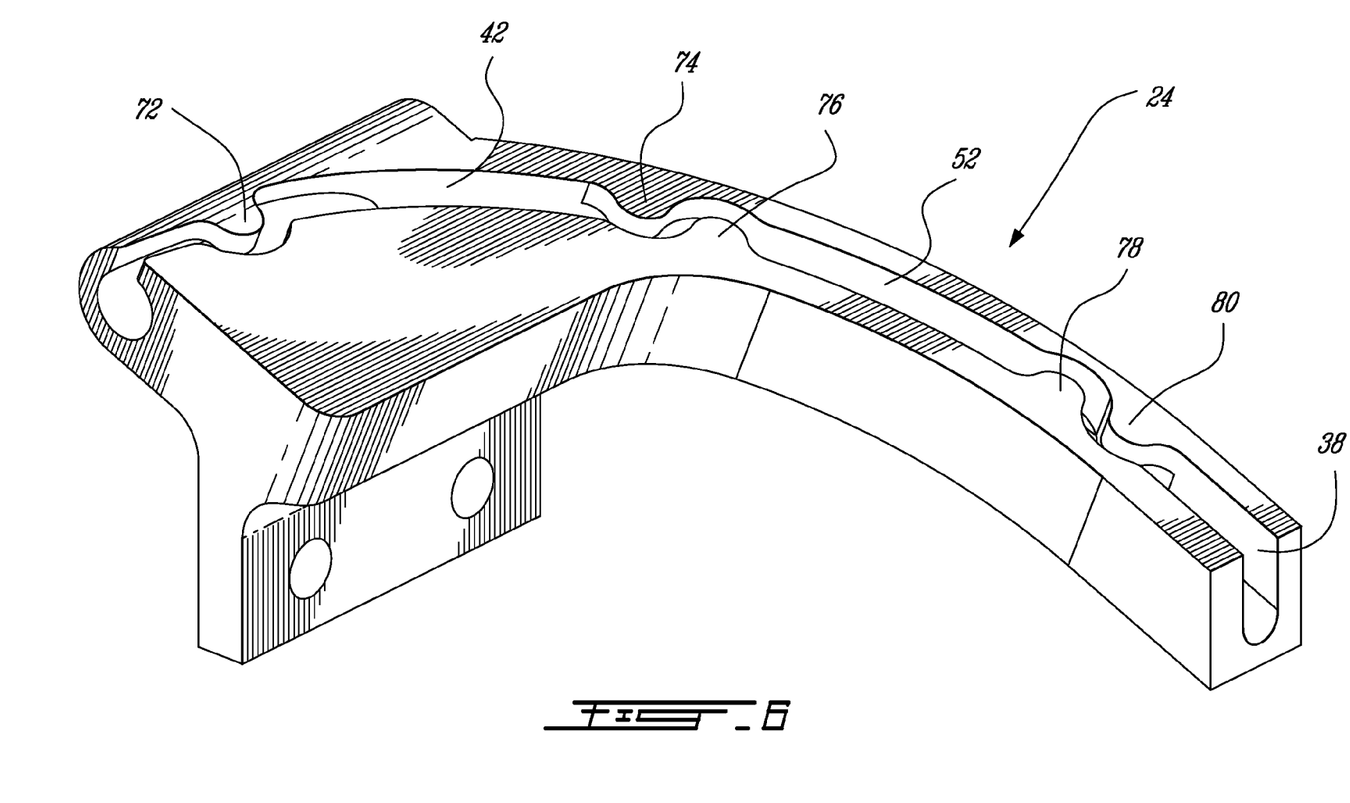
FIG. 6 is an oblique view, enlarged, of a hinge member of the fiber optic hinge.

Although the optical fiber can be free from torsion hindrance in the channels, it can be trapped therein. In this particular embodiment, as shown in FIG. 6, the optical fiber(s) is trapped in the channel 42 by a plurality of confinement tabs 72, 74, 76, 78, 80 which protrude from an edge of the channel 42, above the optical fiber path 22. Henceforth, the optical fiber can be manipulated to enter the channel 42 by fitting into the portion of the opening 52 remaining adjacent the corresponding confinement tab, and thereafter trapped therein once freed from manipulation because the optical fiber will thereafter elastically tend to adopt a configuration straighter than the curvature of the opening adjacent the confinement tab and thereby become trapped. A chicane configuration of two opposite confinement tabs such as pair 74 and 76 can also be used to trap the optical fiber with even further certainty.

To illustrate the looseness the optical fibers can be allowed to have without negatively affecting the concentrations of torsion stress, be it said here that width of the port 38 of the hinge member 24 shown in FIG. 6 can have 4.5 mm for instance, in which case it can loosely receive up to a dozen of optical fibers having 0.9 mm jackets. The torsion is then spread along about 30 cm of optical fiber. It will be understood that the channel can be sized to receive other equipment, such as wire or the like, in addition to optical fibers.

Figure 7:
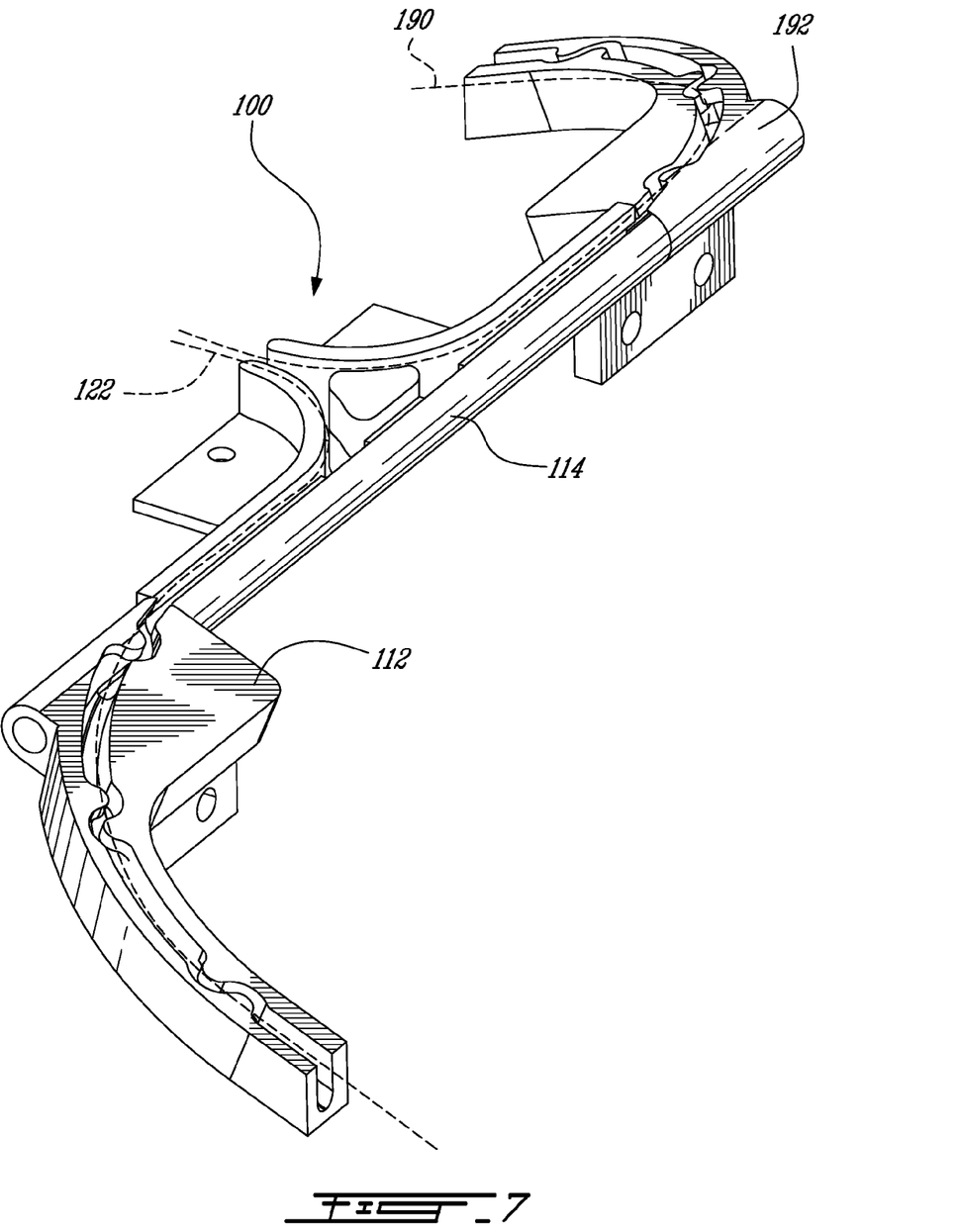
FIG. 7 is an oblique view of an alternate embodiment of a fiber optic hinge, having three hinge members.

Another embodiment of a fiber optic hinge 100 is shown in FIG. 7. In this embodiment, the fiber optic hinge 100 still has a first hinge member 124 and a second hinge member 126 defining a fiber optic path 122, but the second hinge member 126 further defines a second fiber optic path 190 leading to a third hinge member 192. Other variations are also possible.

It will be understood that the particular example described above and illustrated is provided for illustrative purposes and that many alternate embodiments are possible. As it can be seen therefore, the examples described above and illustrated are intended to be exemplary only. The scope is indicated by the appended claims.

What is claimed is:

1. A fiber optic hinge mechanically connectable to a first fiber optic tray and a second fiber optic tray of a fiber optic device, the fiber optic hinge comprising a first hinge member securable to the first fiber optic tray, a second hinge member securable to the second fiber optic tray, the first hinge member being pivotally connected to the second hinge member about a hinge axis of the first and second fiber optic trays, each of the first and second hinge members having a corresponding optical fiber port oriented toward the corresponding tray, away from the hinge axis, and an optical fiber path extending continuously through the first and second hinge members between the port in the first hinge member and the port in the second hinge member and passing by the hinge axis; wherein the optical fiber path is delimited by two channels, one in each corresponding hinge member, both channels being open on a side opposite the corresponding fiber optic tray.

2. The fiber optic hinge of claim 1 wherein the optical fiber path coincides with the hinge axis at the pivotal connection between the first and second hinge members.

3. The fiber optic hinge of claim 1 wherein the optical fiber path has a radius of curvature greater than a critical radius of curvature of the optical fiber all along, and for any relative position of the first hinge member relative the second hinge member.

4. The fiber optic hinge of claim 1 wherein at least one of the ports is oriented normal to the hinge axis.

5. The fiber optic hinge of claim 1 wherein the openings of the channels are aligned when the fiber optic trays are in an unfolded state relative to each other.

6. The fiber optic hinge of claim 1 wherein the hinge members further have a plurality of confinement tabs extending over the corresponding channels, adjacent the opening.

7. The fiber optic hinge of claim 6 wherein at least one of the hinge members has two adjacent confinement tabs, each one of the adjacent confinement tabs extending from an opposite edge of the channel.

8. A fiber optic hinge mechanically connectable to a first fiber optic tray and a second fiber optic tray of a fiber optic device, the fiber optic hinge comprising a first hinge member securable to the first fiber optic tray, a second hinge member securable to the second fiber optic tray, the first hinge member being pivotally connected to the second hinge member about a hinge axis of the first and second fiber optic trays, each of the first and second hinge members having a corresponding optical fiber port oriented toward the corresponding tray, away from the hinge axis, and an optical fiber path extending continuously through the first and second hinge members between the port in the first hinge member and the port in the second hinge member and passing by the hinge axis; wherein the first tray coincides with a first plane parallel and offset from the hinge axis and the second tray coincides with a second plane parallel and coinciding with the hinge axis, wherein the first hinge member extends obliquely between the hinge axis and the first plane.

* * * * *